United States Patent
Casucci et al.

(10) Patent No.: US 7,611,151 B2
(45) Date of Patent: Nov. 3, 2009

(54) MECHANICAL SEAL WITH THERMALLY STABLE MATING RING

(75) Inventors: David P. Casucci, Coventry, RI (US); Daniel Fisher, Coventry, RI (US)

(73) Assignee: John Crane Inc., Morton Grove, IL (US)

( * ) Notice: Subject to any disclaimer, the term of this patent is extended or adjusted under 35 U.S.C. 154(b) by 339 days.

(21) Appl. No.: 11/697,427

(22) Filed: Apr. 6, 2007

(65) Prior Publication Data

US 2007/0235945 A1 Oct. 11, 2007

Related U.S. Application Data

(60) Provisional application No. 60/789,860, filed on Apr. 6, 2006.

(51) Int. Cl.
*F16J 15/38* (2006.01)
(52) U.S. Cl. .................................................. 277/390
(58) Field of Classification Search ................ 277/348, 277/352, 358, 359, 360, 390, 394, 395
See application file for complete search history.

(56) References Cited

U.S. PATENT DOCUMENTS

| | | | |
|---|---|---|---|
| 2,894,770 A * | 7/1959 | Payne ........................... 277/371 |
| 3,193,298 A * | 7/1965 | Voitik et al. ................... 277/373 |
| 3,245,692 A * | 4/1966 | Voitik ........................... 277/373 |
| 3,655,206 A | 4/1972 | Adams |
| 3,765,689 A | 10/1973 | Adams |
| 4,261,581 A | 4/1981 | Hershey |
| 4,364,571 A | 12/1982 | Hershey |
| 4,365,816 A | 12/1982 | Johnson et al. |
| 4,744,569 A | 5/1988 | Wentworth, Jr. et al. |
| 4,889,350 A | 12/1989 | Tranter |
| 4,971,337 A | 11/1990 | Hufford |
| 5,042,824 A | 8/1991 | Gardner et al. |
| 5,058,905 A * | 10/1991 | Nosowicz et al. ........... 277/365 |
| 5,370,403 A * | 12/1994 | Sedy ........................... 277/390 |
| 5,451,065 A * | 9/1995 | Holder ......................... 277/390 |
| 5,529,315 A | 6/1996 | Borrino et al. |
| 5,558,342 A * | 9/1996 | Sedy ........................... 277/390 |
| 5,560,622 A * | 10/1996 | Sedy ........................... 277/390 |
| 5,826,884 A * | 10/1998 | Anderton et al. ............ 277/396 |
| 5,901,965 A | 5/1999 | Ringer et al. |
| 5,954,341 A | 9/1999 | Ringer et al. |

(Continued)

OTHER PUBLICATIONS

Form PCT/ISA/210, International Search Report dated Dec. 10, 2007 for International Application No. PCT/US2007/066010.

(Continued)

*Primary Examiner*—Jennifer H Gay
*Assistant Examiner*—Gilbert Y Lee
(74) *Attorney, Agent, or Firm*—Leydig, Voit & Mayer, Ltd.

(57) ABSTRACT

A seal assembly for sealing between a housing component and a rotating shaft. The seal assembly comprises a pair of relatively rotating rings defining a seal interface. One ring is stationary relative to the housing component. A flexible compressive seal element is compressed axially between the housing component and an axially movable biased compression ring to urge it into radial compressive sealing contact with a cylindrical surface on the stationary ring.

26 Claims, 6 Drawing Sheets

U.S. PATENT DOCUMENTS

| | | | |
|---|---|---|---|
| 6,425,583 B1 * | 7/2002 | Muraki | 277/358 |
| 6,464,231 B2 | 10/2002 | Burroughs | |
| 6,485,023 B2 * | 11/2002 | Budrow et al. | 277/370 |
| 6,626,436 B2 | 9/2003 | Pecht et al. | |
| 6,848,689 B2 * | 2/2005 | Auber | 277/377 |
| 7,240,904 B2 * | 7/2007 | Droscher et al. | 277/349 |
| 2002/0070505 A1 * | 6/2002 | Auber | 277/358 |
| 2006/0103074 A1 * | 5/2006 | Droscher et al. | 277/370 |

OTHER PUBLICATIONS

Form PCT/ISA/237, Written Opinion for International Application No. PCT/US2007/066010.

* cited by examiner

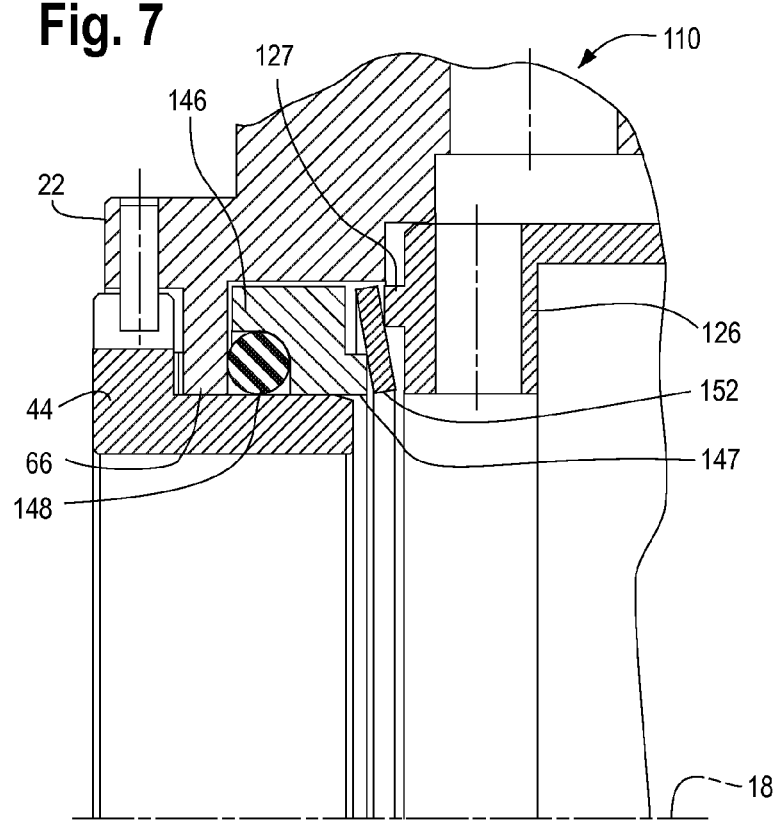
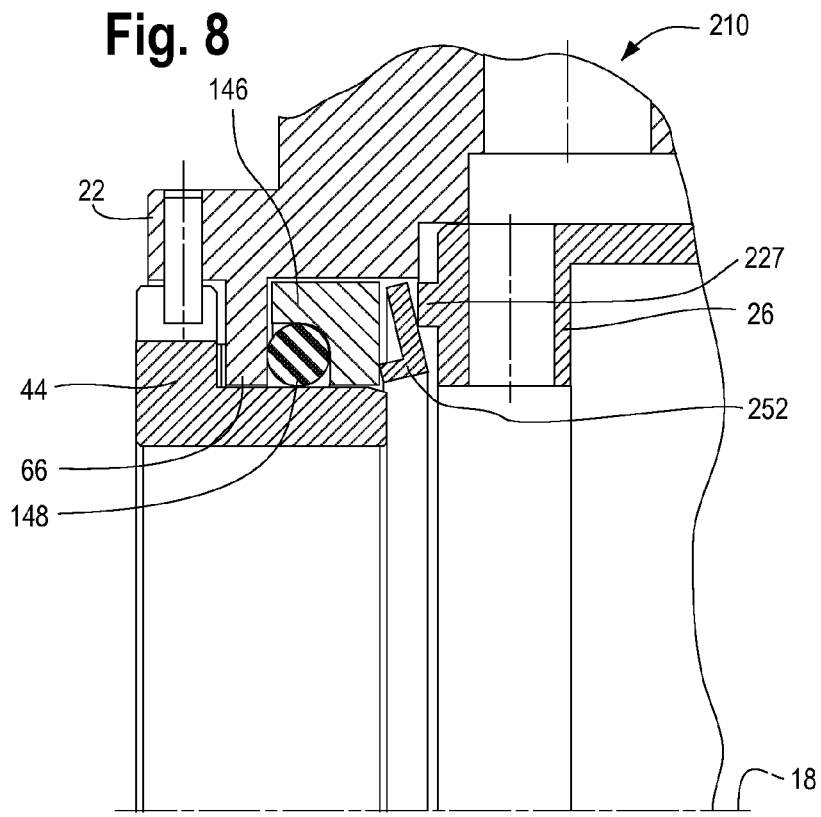

MECHANICAL SEAL WITH THERMALLY STABLE MATING RING

This application claims priority pursuant to 35 U.S.C. § 119 to U.S. Provisional Application No. 60/789,860, filed Apr. 6, 2006.

BACKGROUND OF THE INVENTION

This invention relates to mechanical end face seal assemblies. More particularly, it relates to a high temperature mechanical end face seal assembly with a thermally stable mating ring.

Pumps, especially those in refineries and chemical plants, often handle difficult-to-seal liquids, including propane, butane, and other unstable, combustible, or toxic liquids. These liquids can cause short seal life and undesirable product leakage.

Mechanical end face seal assemblies are known and represent a successful solution to product leakage. Mechanical end face seal assemblies find wide applications in sealing liquids in pumps having a housing and an extending rotating shaft. The seal assemblies usually include a pair of annular seal rings that define a pair of relatively rotatable annular seal faces urged together to define a sealing interface. These seal rings are supported on the shaft and housing by assembly components. One seal ring, the primary ring, is axially movable and is urged by a compression spring or a metal bellows into face-to-face contact with the other seal ring, the mating ring, which is fixed against axial or rotational movement relative to the housing.

The seal assembly can include a single seal, tandem seal, or a double seal where a buffer fluid pressure is supplied at a pressure higher than the process fluid to be sealed in order to prevent leakage of the process fluid across the seal ring faces. Such mechanical seals are available from John Crane Inc., Morton Grove, Ill., and are disclosed in U.S. Pat. Nos. 5,901,965 and 5,954,341, the disclosures of which are incorporated herein by reference. The present invention represents a refinement in the mechanical seals of the type in U.S. Pat. Nos. 5,901,965 and 5,954,341.

FIG. 1 illustrates a traditional (prior art) stationary high temperature mechanical seal assembly 1010 for sealing between a housing 1020 and a rotating shaft 1016. The mechanical seal assembly 1010 of FIG. 1 has a single seal configuration, although other seal configurations, such as dual, tandem or triple seal configurations are also well known in the art.

The mechanical seal assembly 1010 includes a gland plate 1022 attached to the housing 1020. The mechanical seal assembly 1010 further includes a primary ring 1034 rotationally movable with the rotating shaft 1016 and a mating ring 1044 fixed against rotational movement.

The primary ring 1034 and the mating ring 1044 define radially extending seal faces 1040 and 1058 in engaging relationship with each other. The primary ring 1034 is interference fitted in a shell 1036. A bellows 1038 urges the shell 1036 and primary ring 1034 toward the mating ring 1044.

The mating ring 1044 includes a radially outward extending disk portion 1046. The disk portion 1046 of the mating ring 1044 is positioned within an annular groove 1072 defined on the gland plate 1022.

A spiral wound secondary seal 1048, formed of stainless steel and flexible graphite, is also situated in the annular groove 1072 defined on the gland plate 1022. In the installed position, the spiral wound secondary seal 1048 is located between the disk portion 1046 of the mating ring 1044 and the housing 1020.

A series of axially extending fasteners 1028 secure the gland plate 1022 to the housing 1020. The secondary seal 1048 and the disk portion 1046 of the mating ring 1044 are positioned axially between the gland plate 1022 the housing 1020. Tightening the fasteners 1028 clamps the secondary seal 1048 and the disk portion 1046 of the mating ring 1044 axially to secure the mating ring 1044 axially and radially. While this arrangement is effective in securing the mating ring 1044 to the gland plate 1022 and housing 1020, the application of a clamping force on the disk portion 1046 of the mating ring 1044 may distort the seal face 1058 of the mating ring 1044.

FIG. 2 illustrates another traditional (prior art) stationary high mechanical seal assembly 1110 for sealing between a housing 1120 and a rotating shaft 1116. The mechanical seal assembly 1110 includes a gland plate 1122 attached to the housing 1120. The mechanical seal assembly 1110 further includes a primary ring 1134 rotationally movable with the rotating shaft 1116 and a mating ring 1144 fixed against rotational movement.

The primary ring 1134 and the mating ring 1144 define radially extending seal faces 1140 and 1158 in engaging relationship with each other.

The mating ring 1144 includes a radially outward extending disk portion 1146. The disk portion 1146 of the mating ring 1144 is positioned within an annular groove 1172 defined on the gland plate 1122.

Two spiral wound secondary seals 1148 and 1149 are also situated in the annular groove 1172 defined on the gland plate 1122. In the installed position, one spiral wound secondary seal 1148 is located between the disk portion 1146 of the mating ring 1144 and the housing 1120. The other spiral wound secondary seal 1149 is located between the disk portion 1146 of the mating ring 1144 and the gland plate 1122.

Axially extending fasteners 1128 secure the gland plate 1122 to the housing 1120. The two secondary seals 1148 and 1149 and the disk portion 1146 of the mating ring 1144 are positioned axially between the gland plate 1122 and the housing 1120 tightening the fasteners 1128 clamps the secondary seals 1148 and the disk portion 1146 of the mating ring 1144 axially to secure the mating ring 1144 axially and radially. Similar to the mechanical seal assembly 1010 of FIG. 1, the application of a clamping force on the disk portion 1146 of the mating ring 1144 may distort the seal face 1158 of the mating ring 1144.

FIG. 3 illustrates a traditional (prior art) stationary high mechanical seal assembly 1210, having two seals in a tandem seal configuration, for sealing between a housing 1220 and a rotating shaft 1216. The mechanical seal assembly 1210 comprises an inboard seal 1212, closet to the housing 1220, and an outboard seal 1214 which operate together to seal the shaft 1216 relative to the housing 1220. The mechanical seal assembly 1210 further includes an inboard gland plate 1222, an outboard gland plate 1224 and a gland liner 1226.

The inboard seal 1212 includes a primary ring 1234 rotationally movable with the rotating shaft 1216 and a mating ring 1244 fixed against rotational movement. The primary ring 1234 and the mating ring 1244 define radial extending seal faces 1240 and 1258 in engaging relationship with each other. The mating ring 1244 includes a radially outward extending disk portion 1246. The disk portion 1246 of the mating ring 1244 is positioned within an annular groove 1272 defined on the inboard gland plate 1222 and an annular groove 1227 defined in the gland liner 1226.

Two spiral wound secondary seals 1248 and 1249 are also situated in the annular grooves 1272 and 1227 defined on the inboard gland plate 1222 and gland liner 1226. In the installed positioned, one spiral wound secondary seal 1248 is located between the disk portion 1246 of the mating ring and the inboard gland plate 1222. The other spiral wound secondary seal 1249 is located between the disk portion 1246 of the mating ring 1244 and the gland liner 1226.

A series of axially extending fasteners 1228 secure the two gland plates 1222 and 1224 together. The two secondary seals 1248 and 1249 and the disk portion 1246 of the mating ring 1244 are positioned axially between the inboard gland plate 1222 and the gland liner 1226. Tightening the fastener 1228 clamps the secondary seals 1248 and 1249 and the disk portion 1246 of the mating ring 1244 axially to secure the mating ring 1244 axially and radially. Similar to the mechanical seal assemblies 1010 and 1110 of FIGS. 1 and 2, the application of a clamping force on the disk portion 1246 of the mating ring 1244 may distort the seal face 1258 of the mating ring 1244.

The problem of transmission of distortion through the gland plate to the mating ring face is well known. The American Petroleum Institute (API) prohibits the use of clamped mating rings in their Standard 682, Second Edition (re: pg 36, para 6.1.4.1 and FIG. 21). The present invention eliminates this problem.

Another problem experienced in mechanical seal assemblies is associated with system pressure reversal. If secondary seals are not properly sized radially, a system pressure reversal will cause the secondary seal to leak. It is important to configure the secondary seal to maintain the sealing relationship. Furthermore, the API requires that Arrangement 3 seals, pressurized dual seal applications, be designed to stay closed during reverse pressure operation (pg 49, para 7.3.1.2).

BRIEF DESCRIPTION OF THE DRAWINGS

FIG. 7 is a cross-sectional view of an alternative mechanical seal assembly embodying the principles of the present invention, utilizing a spring washer and an elastomeric O-ring secondary seal.

FIG. 8 is a cross-sectional view of an alternative mechanical seal assembly embodying the principles of the present invention, utilizing an L-shaped spring.

DETAILED DESCRIPTION OF THE ILLUSTRATED EMBODIMENTS

The illustrated embodiments of the mechanical seal assemblies embodying the principles of the present invention eliminate axial clamping forces on the mating ring. The arrangement transfers the axial force of a spring to a compression ring that, in turn, causes a flexible compressible packing to impart a radial sealing force on the mating ring. Thus mounted, these mating rings are able to provide vastly enhanced face stability compared to the prior art arrangements. These embodiments allow for the use of high strength, high temperature materials, with good corrosion resistance for the severe sealing environments typically found in refinery applications.

The mating rings of the illustrated embodiments, embodying the principles of the present invention, have dual pressure capability, which can operate with higher-pressure process/barrier liquid either at the external or the internal diameter locations. Pressure reversal capability is provided by the location of the mating ring secondary sealing diameter relative to the hydraulic balance diameter of the rotating seal element.

The seal assemblies can be adapted to a wide-range of temperature extremes found in applications such as pumps operating in high-temperature corrosive environments in refinery distillation units. The mating rings of the illustrated embodiments are suitable for applications requiring a dependable, high-strength rotating seal. Such applications include:

Temperature limits: −100° F. to 800° F.

Pressure limits: 300 pounds per square inch differential pressure (psid) with single-ply bellows, greater than 300 psid with multiple-ply bellows (external or internal pressure capability and can withstand reverse pressurization).

Face speed limits: 5,000 feet per minute (fpm) (Rotating arrangement)

Fluid characteristics: Corrosive or non-corrosive.

Figure 1:
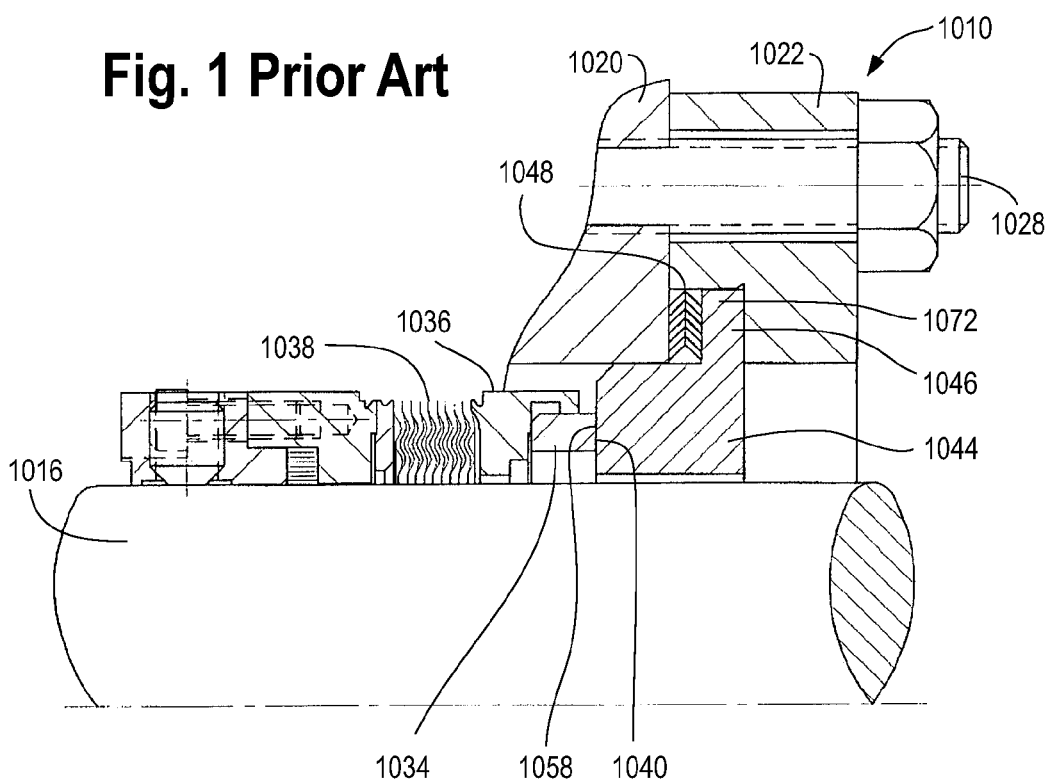
FIG. 1 is a cross-sectional view of a traditional (prior art) mechanical seal assembly.
Figure 2:
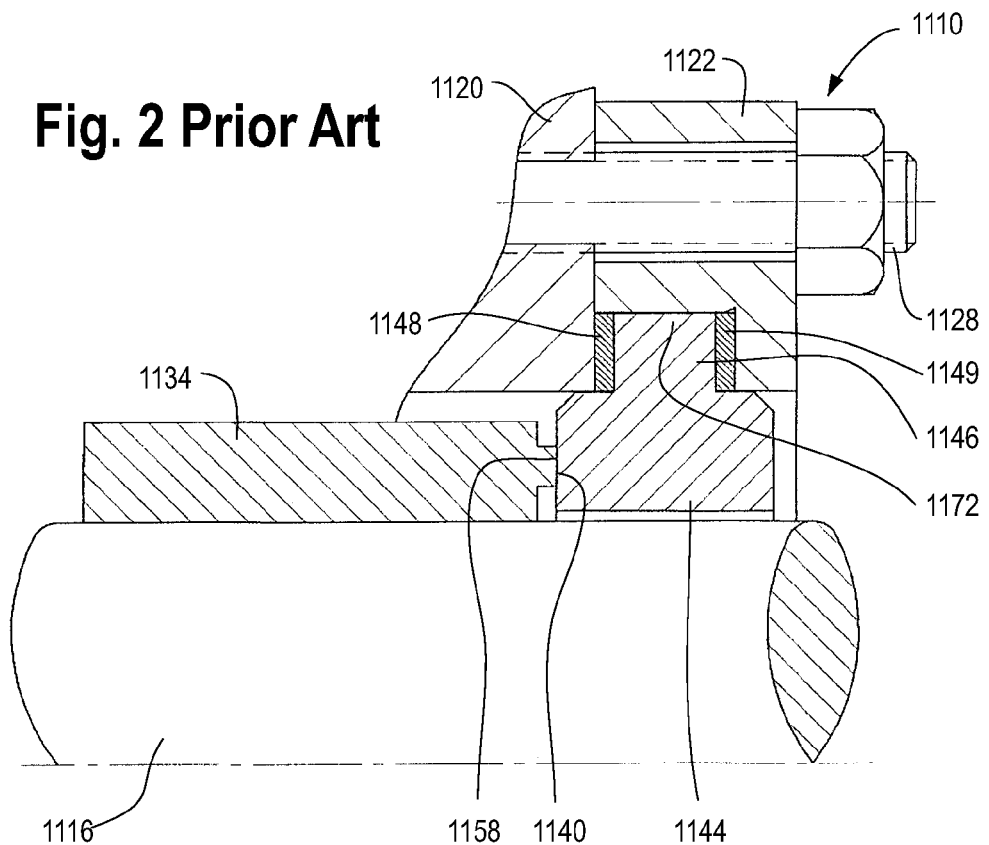
FIG. 2 is a cross-sectional view of another traditional (prior art) mechanical seal assembly.
Figure 3:
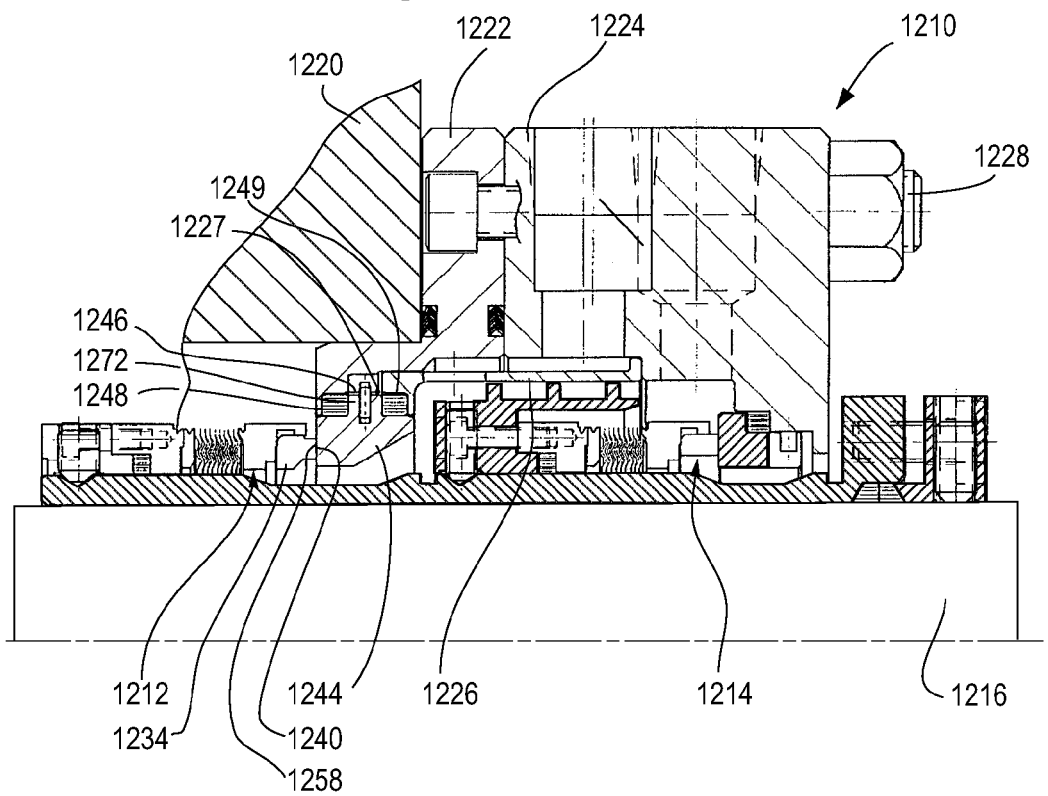
FIG. 3 is a cross-sectional view of a traditional (prior art) mechanical seal assembly having a tandem seal configuration.
Figure 4:
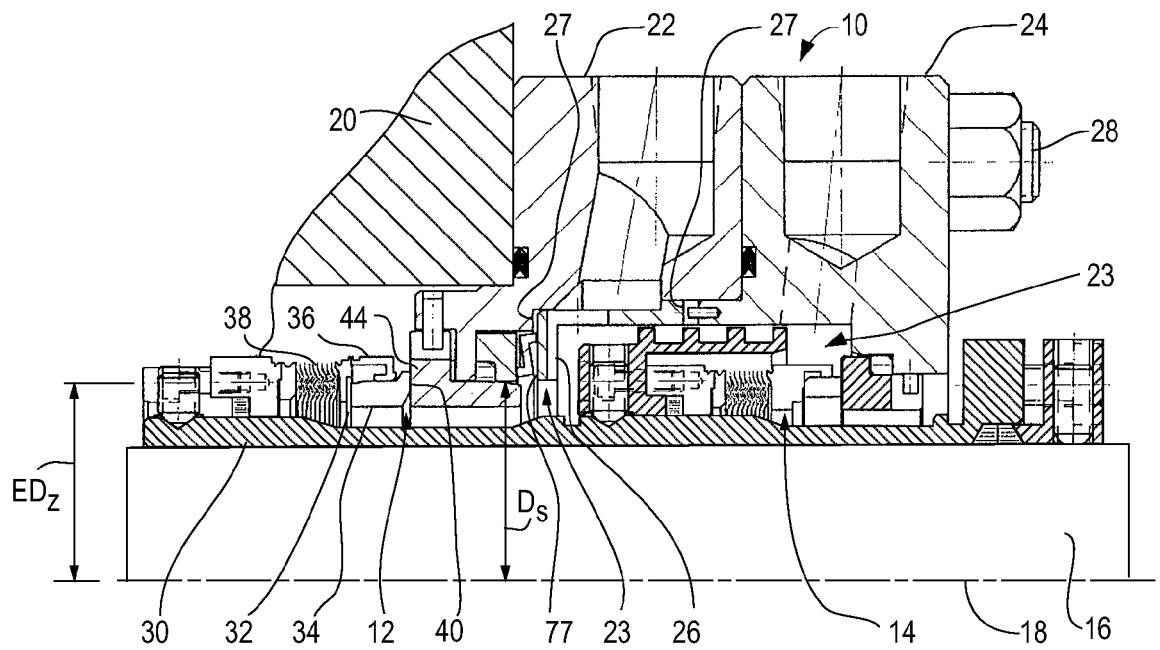
FIG. 4 is a cross-sectional view of a mechanical seal assembly embodying the principles of the present invention.
Figure 5:
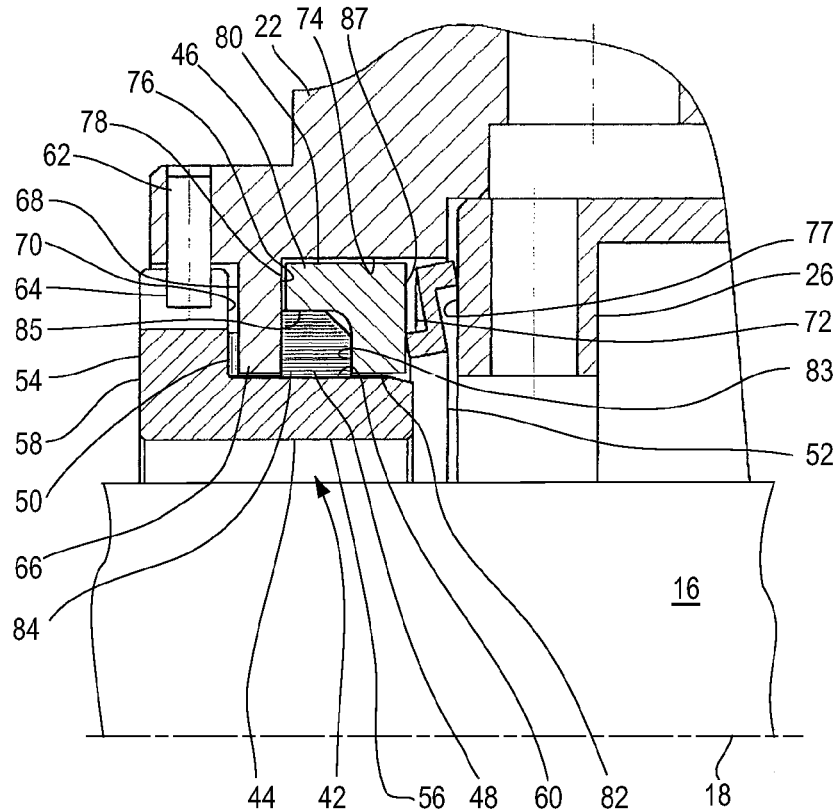
FIG. 5 is an enlarged cross-sectional view of the mating ring and compression ring of the mechanical seal assembly of FIG. 4.

FIGS. 4 and 5 illustrate a high temperature, metal bellows, mechanical seal assembly 10 in accordance with the principles of the present invention. The mechanical seal assembly comprises two mechanical end face seals 12 and 14 in a tandem configuration. A rotatable shaft 16 extends through an aperture (not shown) of a housing 20. The mechanical seal assembly 10 seals the shaft 16 against the housing 20 so that no leakage of the process fluid within the housing 20 is permitted into the atmosphere outside the housing. Since the components discussed below are annular, for convenience, only one-half of the mechanical seal assemblies are illustrated. It is understood that the full seal assembly would be illustrated below the centerline or axis 18 of the shaft 16, as a mirror image of the seal assembly half which is shown.

In the exemplary mechanical seal assembly 10 illustrated in FIG. 4, the mechanical seal assembly comprises an inboard face seal 12, closest the fluid under pressure in housing 20, and an outboard face seal 14. The seals operate together to seal between the shaft 16 and the housing 20.

The term inboard means toward the pressurized fluid within the housing of the apparatus to be sealed. The term outboard means away from the pressurized fluid in the apparatus to be sealed. It should be noted that the term axial and axially as used in describing the embodiments mean longitudinally along the axis 18 of the shaft 16. The terms radial and radially as used in describing the embodiments mean in a plane generally perpendicular to the axis 18 of the shaft 16 toward and away from the axis.

The inboard and outboard seals 12 and 14 are in a tandem configuration. Other seal configurations may be substituted while still utilizing the principles of present invention. For example, the seal configuration may be single, dual or triple seal.

The mechanical seal assembly 10 includes a series of gland plates that define the stationary portion of the seal assembly. They define an annular seal chamber 23 surrounding the shaft.

The gland plates are secured to the housing of the pump or other apparatus for which the seal assembly functions to contain the fluid. They are an extension of the housing component of the apparatus. There could also be included intermediate housings between the apparatus housing and the gland plates.

In the embodiment of FIG. 4, the seal assembly includes an inboard gland plate 22 and an outboard gland plate 24 attached to the housing 20. A gland liner 26 is situated radially inward of the gland plates 22 and 24. The gland liner is captured between axial stops 27 on the inboard and outboard gland plate. It is not axially clamped. That is, its axial length is less than the axial distance between the stops.

Axially extending fasteners, such as a bolts 28, are used to secure the gland plates 22 and 24 together and to the housing 20.

Inboard gland plate 22 includes radially inward extending gland lip 66. It defines radially directed annular seal surface 68. It also defines radially directed annular compression surface 76 and an axially extending cylindrical surface 74. Gland liner 26 includes a radially directed annular biasing contact surface 77.

The inboard and outboard seals 12 and 14 are located in the seal chamber 23, between the shaft 16 and the gland plates 22, 24 and gland liner 26.

A shaft sleeve 30 is fixed to shaft 16 and defines the rotating element of the seal assembly and carries the rotating components of the seal assembly. Sleeve 30 extends axially into the atmosphere. The inboard seal 12 includes a primary ring assembly 32 fixed to the sleeve 30. The primary ring assembly 32 includes a primary ring 34 and a shell 36 interference fitted with the primary ring 34. A bellows 38 is welded to the shell 36 and biases or urges the primary ring 34 in the outboard direction. The primary ring 34 defines a radially extending seal face 40.

The inboard seal 12 further includes mating ring assembly 42 fixed against rotational movement to the gland plates. The mating ring assembly 42, illustrated in detail in FIG. 5, includes a mating ring 44, a compression ring 46, a flexible compression element in the form of a flexible graphite secondary seal or packing 48, a radial flat gasket 50 and a biasing member in the form of spring 52 that biases or urges the compression ring 46 toward radially directed annular compression surface 76 of gland lip 66 of the inboard gland plate 22.

The mating ring 44 includes a radially extending flange portion 54 and an axially extending annular sleeve portion 56. The flange portion 54, of the mating ring 44 defines a radially extending seal face 58 for engagement with the seal face 40 of the primary ring 34. Bellows 38 urges the sealing faces 40 and 58 into relatively rotating sealing relation.

The sleeve portion 56 of the mating ring 44 defines an axially extending outer cylindrical sealing surface 60. A radially extending pin 62 fixed to gland plate 22 engages the mating ring 44 in a groove 64 formed at the outer diameter the flange portion 54 of the mating ring 44. A rotational force results from the applied torque created by frictional forces between the rotating and stationary faces 40 and 58. The pin 62 prevents rotation of the mating ring 44 relative to gland plate 22.

The radial flat gasket 50, which may be a flexible graphite ring, is situated between a radially extending sealing surface 68 of the gland lip 66 of the inboard gland plate 22 and a radially extending surface 70 of the mating ring 44. The function of the flat gasket 50 is to eliminate direct contact between the flange portion of mating ring 44 and the gland lip 66 to prevent distortion from any existing out-of-flat conditions on the gland lip surface 68 or the mating ring surface 70 opposite to the seal face 58. The flat gasket 50 is not intended to act as a secondary seal but does not change the operation of the invention if it does provide a sealing function.

Compression ring 46 is located in annular groove 72 defined by radially directed annular compression surface 76 and axially extending cylindrical surface 74 of gland plate 22. The compression ring 46 defines inboard radially extending surface 78, an axially extending outer surface 80 and an axially extending inner surface 82. The radially extending surface 78 of the compression ring 46 is immediately adjacent but spaced from radially directed annular compression surface 76 of the inboard gland plate 22. The axially extending outer surface 80 of the compression ring 46 is immediately adjacent and radially inward of the axially extending surface 74 of the inboard gland plate 22. The axially extending inner surface 82 of the compression ring 46 is immediately adjacent and spaced from the axially extending outer cylindrical surface 60 of the mating ring 44. The diameter of axial surfaces 80 and 82 are sized such that compression ring 46 is movable axially relative to gland plate 22 and axially extending annular sleeve portion 56 of mating ring 44.

The compression ring 46 further defines an annular groove 84. Compression ring groove 84 is defined by axially extending cylindrical limit or compression surface 85 and radially directed annular compression surface 83. Ring 46 also includes radially directed annular biasing contact surface 87.

The flexible secondary seal 48 is positioned in the annular groove 84 of the compression ring 46. In its installed position, the flexible secondary seal 48 surrounds cylindrical surface 60 of axially extending sleeve portion 56 of the mating ring 44. It is disposed between radially directed annular compression surface 76 of gland lip 66 and inboard radially directed compression surface 85 of compression ring 46.

The mechanical seal assembly 10, illustrated in FIGS. 4 and 5, uses an axial load applied by spring 52, disposed between outboard radially directed annular biasing contact surface 87 of compression ring 46 and radially directed annular biasing contact surface 77 of gland liner 26, to compress the flexible graphite secondary seal 48 against the radially directed annular compression surface 76 of gland lip 66 of the inboard gland plate 22. The spring load is transferred to the flexible graphite secondary seal 48 through the compression ring 46. The compression ring 46 contacts the flexible graphite secondary seal 48 along axially extending surface 85 at the outer diameter of the secondary seal 48 and radially directed compression surface 83 of compression ring 46. The axial load provided by the spring 52, forces the flexible graphite secondary seal 48 into sealing contact with the radially directed surface 76 of the inboard gland plate 22. In addition, the axial force on the flexible graphite secondary seal 48 creates a radial force between the flexible graphite secondary seal 48 and the mating ring 44. This radial load forces the flexible graphite secondary seal 48 into sealing contact with the outer cylindrical surface 60 of the axially extending annular portion 56 of mating ring 44. Therefore, the axial spring force acts through the compression ring 46 and flexible graphite secondary seal 48, creating an axial load onto the lip 66 of inboard gland plate 22 and a radial force onto the mating ring 44, generating sufficient contact pressure (Pcon), on both surfaces 76 and 60, to seal against the applied fluid pressure.

It is possible that the radial force exerted onto the mating ring 44 by the flexible graphite secondary seal 48 may also be sufficient to resist the applied torque at the seal faces 40 and 58. If sufficient force can be generated, the need for an antirotation device, such as the pin 62, would be eliminated.

The spring 52 also functions to accommodate for the cumulative part tolerances. This tolerance stack up is a major consideration in the overall design. The large tolerance of the flexible graphite secondary seal 48, in addition to the other component parts, is too large to allow rigid components to control the axial force applied to the flexible graphite secondary seal 48. The spring 52 is also designed to provide the axial force necessary to generate the minimum Pcon on all sealing surfaces at the maximum cavity condition. In addition, it provides a controlled maximum force at the minimum cavity condition.

The spring material also needs to be compatible with the environment and have the appropriate material properties to control the loads for the space available. Typically, high strength, high temperature, age-hardened, nickel alloys are used for the spring material. Inconel 718 is a suitable material.

High temperature mating rings require the use of high temperature secondary seals to seal the product or barrier liquid from leaking between the mating ring and gland to atmosphere. The materials most commonly used for this secondary seal 48 are flexible graphite, die formed rings. These rings are made of flexible graphite ribbon wound into an annular ring the width of the ribbon and compressed into a die formed ring.

These secondary seals require an applied force to effect sealing. The required applied force to seal at various pressures is difficult to predict, as the die forming process does not yield rings with consistent material and physical properties (i.e., density, Poisson's ratio, force/deflection behavior). Empirical testing can be performed to determine the critical properties for flexible graphite rings produced with a given geometry and density. From this data, load versus deflection behavior can be predicted. For example, the radial force can be determined for a given applied axial force and the required Pcon to seal a given product pressure.

The arrangement of the illustrative embodiment eliminates the clamping forces directly imposed on the mating ring 44 found in other, more traditional, designs. The axial force provided by the spring 52 pushes the secondary seal 48 against the radially extending surface 76 of the gland lip 66 of inboard gland plate 22. No axial forces are directly imposed on the mating ring 44 thereby eliminating the transmission of face distortion caused by non-axisymmetric stresses (i.e., gland bolting stresses).

The compression ring 46 acts to contain the flexible graphite secondary seal 48 on the two surfaces 83 and 85 defining the groove 84. It acts to transfer the spring axial force to the flexible graphite secondary seal 48 urging it into sealing contact with the radially directed annular compression surface 76 on inboard gland plate 22. In addition, it contains the flexible graphite secondary seal 48 at its diameter and forces the flexible graphite secondary seal 48 radially inward into sealing contact with the outer cylindrical surface 60 of mating ring 44.

The mechanical seal assembly 10, as illustrated in FIGS. 4 and 5, is able to minimize or eliminate face distortion, caused by the relaxation of the radial contact pressure along the axially extending secondary seal surfaces due to the difference in coefficient of thermal expansion (CTE) between the mating ring and the gland (as with most traditional designs). This is achieved by forming the compression ring 46 from similar material, or material having similar CTE to the material for forming the mating ring 44 and the inboard gland plate 22. The compression ring 46 contacts only the secondary seal 48 and the spring 52. The compatible material combination creates a constant radial squeeze on the secondary seal 48 regardless of temperature. It is preferable that the compression ring 46 and the mating ring 44 be made from the same material. If the compression ring 46 and the mating ring 44 are made from the dissimilar materials (i.e., materials with dissimilar CTE), for the materials to be compatible, the CTE of any one material should not be more two times (2×) the CTE of the other material. One such compatible material combination would be for the mating ring 44 to be formed from solid silicon carbide or a carbon/silicon carbide composite and the compression ring 46 to be formed from solid silicon carbide. By selecting similar materials of construction for the mating ring 44 and compression ring 46, changes in temperature will not affect the flexible graphite secondary seal radial cavity as would occur with dissimilar materials with different CTE. The controlled radial cavity of the secondary seal 48, as temperature changes, allows for the mating ring seal face 58 to remain flat. The minimum required, radial contact pressure (Pcon) is maintained regardless of temperature.

By selecting materials of construction for the mating ring 44 and compression ring 46 that have a closely matched CTE, the ideal radial squeeze on the secondary seal 48 can be maintained throughout a wide operating temperature range. Once pre-loaded and assembled with the spring 52, a constant force with respect to changes in temperature is transmitted through the flexible graphite secondary seal 48 to the gland lip 66 and mating ring 44 since the cavity dimensions do not change as a result of relative thermal growth. The mating ring 44 does not directly contact the inboard gland plate 22. There is clearance between the mating ring 44 and compression ring 46 and between the compression ring 46 and the inboard gland plate 22. The mating ring 44 contacts only the flexible graphite secondary seal 48 and the flat gasket 50.

The mating ring 44 is held in place by friction between the flexible graphite secondary seal 48 and the cylindrical outer surface 60 of the mating ring 44, and supported by the flat gasket 50 between the mating ring 44 and the gland lip 66. The axial load on the compression ring 46, provided by the spring 52, controls the Pcon in the axial and radial direction. The minimum axial load is empirically determined so that the flexible graphite secondary seal 48 has the minimum required Pcon to seal on all sealing surfaces (both radial and axial). The spring 52 is designed to provide the minimum load at the maximum cavity dimension and a controlled maximum load at the minimum cavity dimension.

Clamping forces, as a result of gland fasteners 28, transferred through the inboard gland plate 22 to the mating ring 44, are eliminated. The secondary seal 48 is forced against the gland lip 66 in an axial direction by the spring 52. The spring 52 is designed to provide a minimum force to seal the applied pressure (axially and radially), through the operating temperature range, and to accommodate for part tolerance stack up.

The resultant radial force from the axial force provided by the spring 52, urges the secondary seal 48 into sealing contact with the mating ring 44 along a diameter that is near the bellows mean effective diameter, or balance diameter. Selecting the mating ring sealing diameter to be near to the balance diameter allows for external or internal pressure operation by minimizing the pressure forces acting to move or unseat the mating ring. A free body analysis of the forces on the mating ring shows that the forces are in equilibrium (i.e., the mating ring remains seated against the flat gasket 50 at gland lip 66 for both outer diameter or inner diameter pressurization).

The mechanical seal assembly 10 is capable of dual pressure operation (i.e., external or internal pressure). By locating the sealing diameter of the mating ring near the bellows mean effective diameter, the pressure forces are said to be "balanced" allowing the mating ring to have a slight net positive seating force against the flat gasket and gland lip for both external and internal pressure.

In this embodiment, the sealing diameter $D_S$ of the mating ring 44 is the diameter of outer cylindrical surface 60. It is designed to be near the Mean Effective Diameter $ED_Z$ of the bellows 38 as shown in FIG. 4. The effective diameter or "ED" of a bellows is a fictitious diameter up to which the applied pressure effectively penetrates to exert a closing force on the seal. This is akin to the "balance diameter" of a pusher-type seal. The Mean Effective Diameter is a theoretical effective diameter at zero differential pressure applied on the seal ring, which is taken to be the arithmetic mean of the bellows core outside and inside diameters. Preferably, the mating ring sealing diameter $D_S$ is within plus and minus 10% (+10% and −10%) of the effective diameter $ED_Z$ of the bellows at zero differential pressure. More preferably, the mating ring sealing diameter $D_S$ is within +6% and −6% of the effective diameter $ED_Z$ of the bellows at zero pressure.

Figure 6:
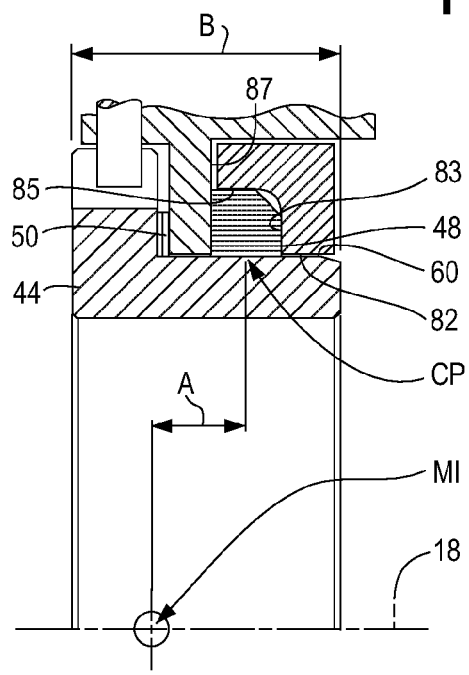
FIG. 6 is an enlarged cross-sectional view of the mating ring and compression ring of the mechanical seal assembly of FIG. 4, showing the preferred location of the second moment of the cross-sectional mating ring area.

It is preferable that the second moment (motion of inertia) MI of the cross-sectional mating ring area with respect to the centraidal axis 18 is near the center of pressure CP caused by the flexible graphite seal as shown in FIG. 6. In particular, it is preferable that the ratio of |A/B| is less than or equal to 0.4, wherein A is the axial distance from the center of pressure CP caused by the flexible seal 48 to the second moment MI of the cross-sectional mating ring area with respect to the centroidal axis and B is the overall axial length of the mating ring 44. It is more preferable that the ratio of |A/B| is greater than or equal to 0.28 and is less than or equal to 0.38.

FIG. 7 illustrates an alternative mechanical seal assembly 110 that utilizes an elastomeric O-ring secondary seal 148 in place of the flexible graphite secondary seal ring and an alternate spring washer 152. The compression ring 146 is similar to the compression ring 46 of the embodiment illustrated in FIG. 4 but includes an axially extending rim 147 directed towards the gland liner 126. The gland liner 126 is similar to the gland liner 26 of the embodiment illustrated in FIG. 4 but includes an axially extending rim 127 directed towards the compression ring 146. The spring washer 152, in combination with axially extending rims 147 and 127 of the compression ring 146 and gland liner 126, bias or urge the compression ring 146 towards the gland lip 66 of the inboard gland plate 22.

FIG. 8 illustrates a mechanical seal assembly 210 similar to the mechanical seal assembly 110 illustrated in FIG. 7 but utilizes a spring 252 having an L-shaped cross section. The gland liner 26 of the mechanical seal assembly 210 illustrated in FIG. 8 includes an axially extending rim 227. The L-shaped spring 252, in combination with the axially extending rim 227 of the gland liner 26, bias or urge the compression ring 146 towards the gland lip 66 of the inboard gland plate 22.

Figure 9:
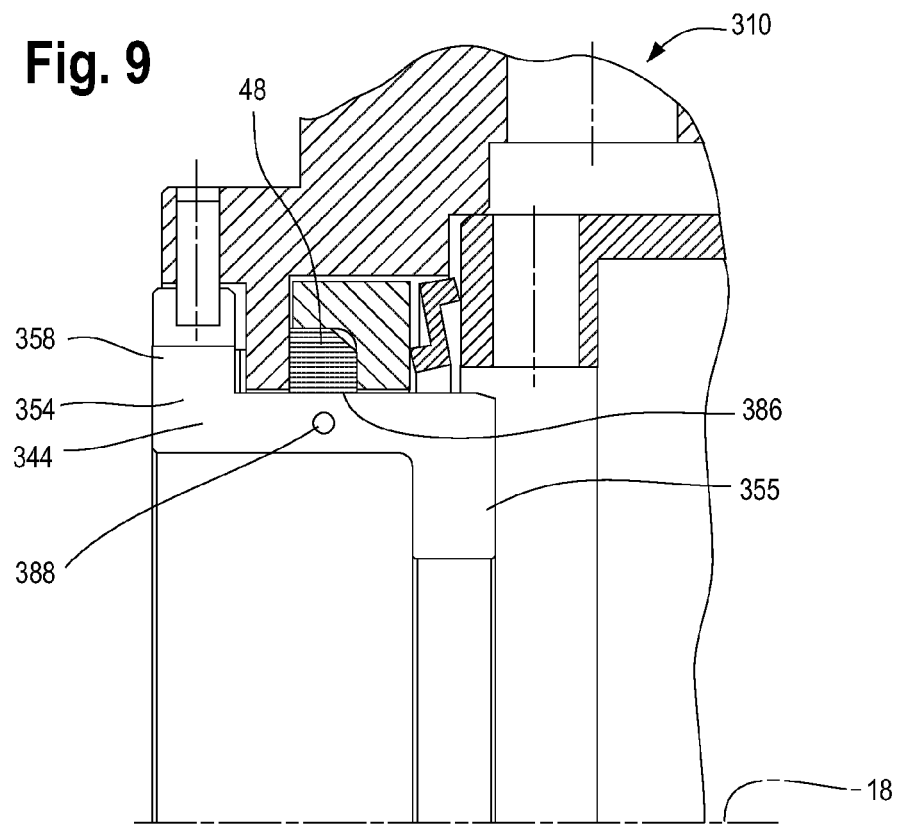
FIG. 9 is a cross-sectional view of an alternative mechanical seal assembly embodying the principles of the present invention, locating the center of the radial contact stress from the secondary seal near the center of rotation of the mating ring.

FIG. 9 illustrates an alternative mechanical seal assembly 310 that locates the center of the radial contact stress 386 from the secondary seal 48 near the cross sectional centroid 388 of the mating ring 344. The mechanical seal assembly 310 illustrated in FIG. 9 is similar to the mechanical seal assembly 10 illustrated in FIG. 4 but the mating ring 344 includes a radially inward extending portion 355 having a radially length approximately the same the length of the radially outward extending flange portion 354 of the mating ring. This mating ring geometry provides the lowest possible distortion as a result of the applied stress. The mating ring design minimizes thermal distortion at the sealing face 358 by locating the contact area of the secondary seal 48 near the cross-sectional centroid 388 so as to have a near zero net moment about the center of gravity/rotation. However, this is possible only when there is sufficient radial space in the equipment for the larger radial cross-section of the mating ring 344.

Figure 10:
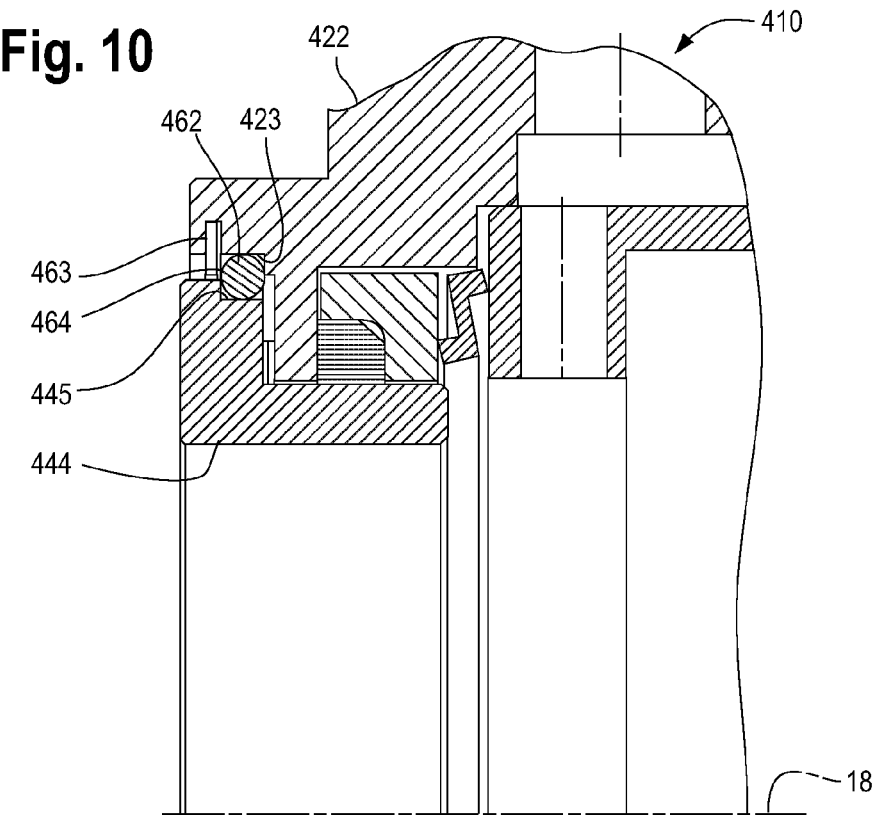
FIG. 10 is a cross-sectional view of an alternative mechanical seal assembly embodying the principles of the present invention, utilizing a metal ball in a groove held by a snap ring.

FIG. 10 illustrates an alternative mechanical seal assembly 410 that utilizes a metal ball 462 in a groove held by a snap ring 463. The mechanical seal assembly 410 illustrated in FIG. 9 is similar to the mechanical seal assembly 10 illustrated in FIG. 4 but utilizes a metal ball 462 positioned in a groove 464 held by a snap ring 463, rather than a pin, to fix the mating ring 444 rotationally to the inboard gland plate 422. The notch 423 in the inboard gland plate 422 and the notch 445 in the mating ring 444 defining the groove 464 are not circumferentially continuous. Rather, the inboard gland plate 422 includes a radially inward extending rib (not shown) interrupting the circumferential continuity of the inboard gland plate notch 423 and the mating ring 444 includes a radially outward extending rib (not shown) interrupting the circumferential continuity of the mating ring notch 445. As the mating ring 444 is rotated relative to the inboard gland plate 422, the ball 462 engages the rib of the inboard gland plate 422 and the rib of the mating ring 444, preventing further rotational movement of the mating ring 444 relative to the inboard gland plate 422.

Figure 11:
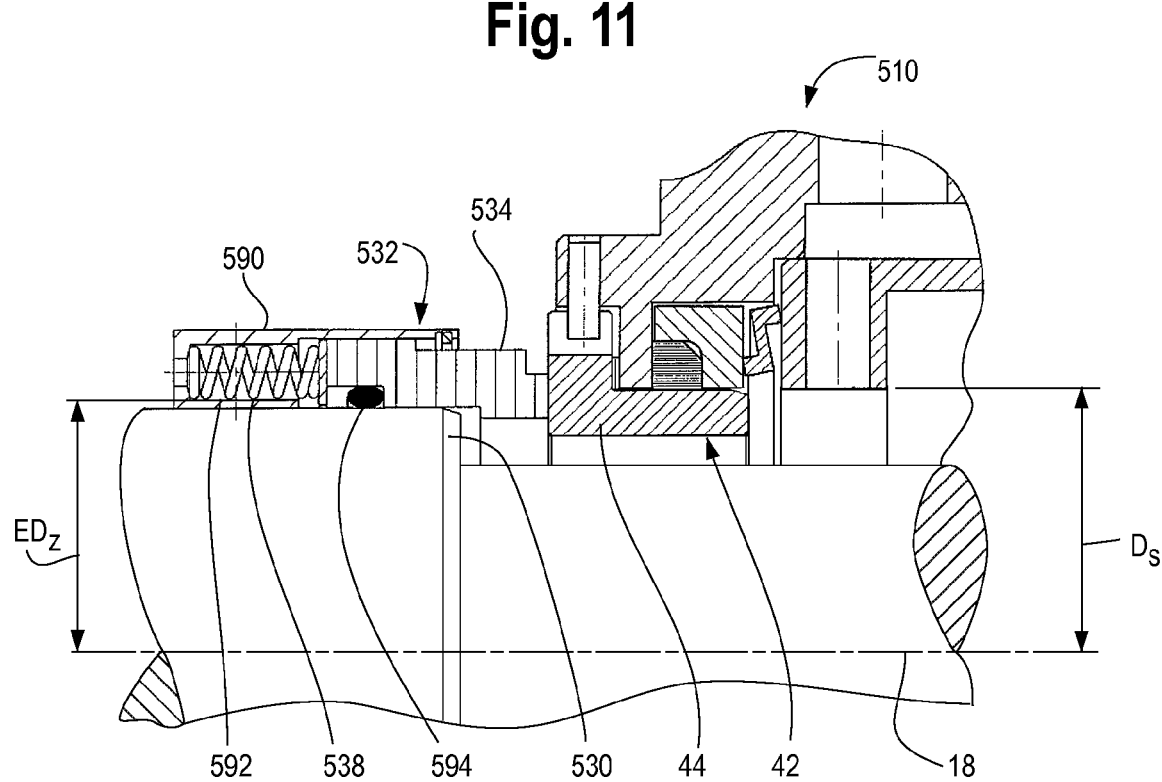
FIG. 11 is a cross-sectional view of a pusher seal mechanical seal assembly embodying the principles of the present invention.

FIG. 11 illustrates a pusher seal type mechanical seal assembly 510 embodying the principles of the present invention. The mating ring assembly 42 of the mechanical seal assembly 510 illustrated in FIG. 10 is the same as the mating ring assembly 42 of the mechanical seal assembly 10 illustrated in FIG. 4. The differences between the mechanical seal assemblies 510 and 10 lie in the primary ring assemblies. The primary ring assembly 532 illustrated in FIG. 10 is of a pusher seal type. Rather than using a bellows, the pusher seal type primary ring assembly 510 includes a coil spring 538 positioned in a cavity 592 of a retainer 590. A secondary seal is provided by an O-ring 594 which seals the primary ring 534 against the shaft sleeve 530. The primary ring assembly 532 of the type illustrated in FIG. 10 is described in further detail in commonly assigned U.S. Pat. No. 5,529,315, the disclosure of which is incorporated herein by reference. Similar to the mechanical seal assembly 10 illustrated in the FIG. 4, the sealing diameter $D_S$ of the mating ring 44 is designed to be near the balance diameter $ED_Z$ of the O-ring. The balance diameter of the O-ring 594 is akin to the effective diameter of the bellows at zero differential pressure of a metal bellows type seal. Preferably, the mating ring sealing diameter $D_S$ is within plus and minus 10% (+10% and −10%) of the balance diameter $ED_Z$ of the O-ring. More preferably, the mating ring sealing diameter $D_S$ is within +6% and −6% of the balance diameter $ED_Z$ of the O-ring.

Various principles of the present invention have been explained with reference to the embodiments shown and described. It must be understood that numerous modifications may be made without departing from the spirit and scope of the invention as defined by the appended claims.

The invention claimed is:

1. A seal assembly providing a fluid tight seal between a housing and a rotating shaft, said seal assembly comprising:
a housing component defining an annular seal chamber surrounding the shaft, said housing component defining a radially directed annular compression surface, and a radially directed annular biasing contact surface spaced from said radially directed annular compression surface;
an axially movable primary ring rotatable with the shaft and defining a radially directed annular sealing face;
a mating ring fixed against rotation relative to the housing component defining a radially directed annular sealing face, said sealing faces of said rings defining a relatively rotatable sealing interface,
said mating ring including an axially extending annular portion defining an outer cylindrical surface disposed radially inwardly of said radially directed surfaces of said housing component;
an annular compression ring disposed intermediate said radially directed surfaces of said housing component and having said annular compression ring member including a radially directed compression surface and a radially directed biasing contact surface;
an annular flexible compression element disposed between said radially directed annular compression surface of said housing component and said radially directed annular compression surface of said compression ring member;
and a biasing member disposed between said radially directed annular biasing contact surface of said housing component and said radially directed annular biasing contact surface of said compression ring;
said biasing member urging said compression ring toward said radially directed annular compression surface of said housing component to axially compress said flexible compression element and urge it radially into contact with said outer cylindrical sealing surface of said axially extending annular portion of said mating ring.

2. The seal assembly as claimed in claim 1 wherein said compression ring includes an axially extending cylindrical limit surface forming an annular groove with said radially directed annular compression surface, and said annular flexible compression element is disposed in said groove and is compressed radially between said axially extending cylindrical limit surface and said outer cylindrical surface of said axially extending annular portion of said mating ring.

3. The seal assembly as claimed in claim 1 or 2 wherein said housing component includes at least one gland plate and said at least one gland plate includes said radially directed annular compression surface.

4. The seal assembly as claimed in claim 3 wherein said housing component includes an inboard gland plate, an outboard gland plate and a gland liner, said inboard gland plate includes said radially directed annular compression surface and said gland liner includes said radially directed annular biasing contact surface.

5. The seal assembly as claimed in claim 2 wherein said flexible compression element is formed from flexible graphite.

6. The seal assembly as claimed in claim 5 wherein said flexible compression element is a die formed ring of wound flexible graphite ribbon.

7. The seal assembly as claimed in claim 2 wherein said flexible compression element is formed from elastomer.

8. The seal assembly as claimed in claim 1 wherein said compression ring includes an inner axially extending inner surface and spaced from surrounding said outer cylindrical surface of said mating ring.

9. The seal assembly as claimed in claim 1 wherein said biasing member comprises a spring having a Z-shaped cross section.

10. The seal assembly as claimed in claim 9 wherein the ratio of |A/B| is less than or equal to 0.4, wherein A is the axial distance from the center of pressure caused by said flexible compression element to the second moment of the cross-sectional mating ring area with respect to the centroidal axis and B is the overall axial length of the mating ring.

11. The seal assembly as claimed in claim 10 wherein the ratio of |A/B| is greater than or equal to 0.28 and is less than or equal to 0.38.

12. The seal assembly as claimed in claim 9 wherein said spring is made of Inconel 718.

13. The seal assembly as claimed in claim 1 wherein said biasing member comprises a spring having an L-shaped cross section and wherein one of said gland plate and said compression ring includes a rim extending axially towards said spring.

14. The seal assembly as claimed in claim 13 wherein said spring is made of Inconel 718.

15. The seal assembly as claimed in claim 1 wherein said biasing member comprises a spring comprising a spring washer and wherein said gland plate and said compression ring each include a rim extending axially towards said spring.

16. The seal assembly as claimed in claim 15 wherein said spring washer is made of Inconel 718.

17. The seal assembly as claimed in claim 1 wherein said assembly further comprises a radial flat gasket positioned axially between said mating ring and said gland plate.

18. The seal assembly as claimed in claim 17 wherein said radial flat gasket is made from flexible graphite.

19. The seal assembly as claimed in claim 1 wherein the coefficient of thermal expansion of the material forming said compression ring is less than two times the coefficient of thermal expansion of the material forming said mating ring.

20. The seal assembly as claimed in claim 19 wherein the coefficient of thermal expansion of the material forming said mating ring is less than two times the coefficient of thermal expansion of the material forming said compression ring.

21. The seal assembly as claimed in claim 1 wherein said compression ring is formed from silicon carbide and said mating ring is formed from a carbon, silicon carbide composite.

22. The seal assembly as claimed in claim 1 wherein the material forming said compression ring is the same as the material forming said mating ring.

23. The seal assembly as claimed in claim 22 wherein said compression ring and said mating ring are formed from silicon carbide.

24. The seal assembly as claimed in claim 1, said assembly further comprising a bellows urging said primary ring towards said mating ring.

25. The seal assembly as claimed in claim 24 wherein said bellows defines an effective diameter at zero differential pressure applied on said primary ring, and the diameter of said outer cylindrical outer surface of said mating ring is within +10% and −10% of said effective diameter of said bellows at zero differential pressure.

26. The seal assembly as claimed in claim 24 wherein the diameter of said outer cylindrical surface of said mating ring is within +6% and −6% of said effective diameter of said bellows at zero differential pressure.

\* \* \* \* \*